(12) United States Patent
Wakamatsu et al.

(10) Patent No.: US 6,829,619 B1
(45) Date of Patent: Dec. 7, 2004

(54) INFORMATION PROVIDING SERVER

(75) Inventors: Hidehisa Wakamatsu, Kawasaki (JP); Satoshi Kasai, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/451,446

(22) Filed: Nov. 30, 1999

(30) Foreign Application Priority Data

Feb. 2, 1999 (JP) .......................................... 11-024752

(51) Int. Cl.[7] .......................................... G06F 17/30
(52) U.S. Cl. .......................... 707/104.1; 707/1; 707/2; 707/10; 709/203; 345/760; 345/762; 715/501.1
(58) Field of Search ........................ 707/1, 2, 3, 4, 707/10, 104.1; 709/200–225; 715/501.1, 513–516; 345/625, 634, 968, 744

(56) References Cited

U.S. PATENT DOCUMENTS

| | | | | |
|---|---|---|---|---|
| 5,517,605 A | * | 5/1996 | Wolf ........................ | 707/104.1 |
| 5,628,010 A | * | 5/1997 | Ooishi et al. .................. | 707/1 |
| 5,742,816 A | * | 4/1998 | Barr et al. ...................... | 707/3 |
| 5,987,454 A | * | 11/1999 | Hobbs ........................... | 707/4 |
| 6,035,055 A | * | 3/2000 | Wang et al. ................. | 382/118 |
| 6,085,219 A | * | 7/2000 | Moriya ....................... | 709/200 |
| 6,119,135 A | * | 9/2000 | Helfman ..................... | 707/513 |
| 6,167,382 A | * | 12/2000 | Sparks et al. ................. | 705/26 |
| 6,181,838 B1 | * | 1/2001 | Knowlton .................... | 382/305 |
| 6,275,829 B1 | * | 8/2001 | Angiulo et al. ............. | 707/104 |
| 6,335,746 B1 | * | 1/2002 | Enokida et al. ............. | 345/839 |
| 6,415,282 B1 | * | 7/2002 | Mukherjea et al. ............ | 707/3 |
| 6,473,796 B2 | * | 10/2002 | Tanaka ....................... | 709/224 |

FOREIGN PATENT DOCUMENTS

| | | |
|---|---|---|
| JP | 6-44324 | 2/1994 |
| JP | 10-97522 | 4/1998 |

* cited by examiner

*Primary Examiner*—Greta Robinson
*Assistant Examiner*—Cheryl Lewis
(74) *Attorney, Agent, or Firm*—Staas & Halsey LLP

(57) ABSTRACT

An information providing server is connected via the Internet to a mediation server and a reference terminal. The mediation server, when receiving a request for searching a home page, request the server for an index image file. The information providing server creates the index image file by use of an HTML file and an image file held by the information providing server itself, and the index image file being configured such that a first screen of the home page corresponding to the searching request is displayed with a single picture. The created index image file is given from the information providing server to the reference terminal through the mediation server, and images corresponding to the index image file are displayed as a searched result in the reference terminal and are referred to by a user of the reference terminal.

36 Claims, 16 Drawing Sheets

FIG. 8

KEYWORD SOCCER, REPRESENTATIVE PLAYER OF JAPAN

SEARCHED RESULT

| NAME OF HOME PAGE | CONTENT |
|---|---|
| 10BAN(G)homepage | UNIFORM NUMBER 10 OF JAPANESE PLAYERS IN SUCCESSIVE GENERATIONS... |

| Calcio Club | GIVING ENTHUSIASTIC ENCOURAGEMENT TO REPESENTATIVE PLAYERS OF JAPAN |
|---|---|

| Club Defenders | GIVING TECHNICAL THEME TO SPECIALIZED DEFENDERS ... |
|---|---|

| NETWORK OF REPRESENTATIVE PLAYERS OF JAPAN | NETWORK IN TOPIC ABOUT REPRESENTATIVE PLAYERS OF JAPAN |
|---|---|

10BAN

Calcio Club defenders

| | NAME OF HOME PAGE | CONTENT |
|---|---|---|
| No. 1 | 10BAN(G)HomePage | UNIFORM NUMBER 10 OF JAPANESE PLAYERS IN SUCCESSTIVE GENERATIONS... |
| No. 2 | Calcio Club | GIVING ENTHUSIASTIC ENCOURAGEMENT TO REPESENTATIVE PLAYERS OF JAPAN |
| No. 3 | Club Defenders | GIVING TECHNICAL THEME TO SPECIALIZED DEFENDERS... |
| No. 4 | Fight REPRESENTATIVE PLAYERS OF JAPAN | GIVING SUPPORT FROM BOTTOM OF HEART TO REPRESENTATIVE PLAYERS OF JAPAN |
| No. 5 | NETWORK OF REPRESENTATIVE SOCCER PLAYERS OF JAPAN | NETWORK IN TOPIC ABOUT REPRESENTATIVE PLAYERS OF JAPAN |

INFORMATION PROVIDING SERVER

BACKGROUND OF THE INVENTION

1. Field of the Invention

The present invention relates to an information providing server used when the information is searched through the Internet (including a intranet (intranets)).

2. Description of the Prior Art

A plurality of computers (servers, computers) connected to the Internet are stored with an enormous amount of information. The information stored therein is provided in the form such as home pages to users of the Internet. Conventionally, a search service (a retrieval service) for searching (retrieving) the home pages has hitherto been provided users (clients). The users search the home page containing a desired item of information. The searching service is provided as a search engine executed on a browser.

In the-searching service given so far, in the case of searching the desired home page by use of a keyword, the user is given character information on the home page corresponding to this keyword and link information to the information providing server stored with the home page concerned.

For instance, the user, when having an intention of reference a home page relative to representative soccer players of Japan, inputs keywords such as, e.g., "soccer" and "representative players of Japan" to the search engine actuated by the reference terminal (equipment), and requests searching of the information corresponding to the keywords. Thereupon, the information corresponding to the keywords is retrieved on the Internet, and a retrieved result is transmitted back to the reference terminal of the user.

FIG. 16 shows one example of the searched result obtained by the conventional searching service. The searched result is returned, whereby a table (a list of information) as shown in FIG. 16 is displayed on a display screen of the reference terminal. The table comprises a title and a URL (uniform Resource Locator) of the home page, and a summary of the home page as the form of character information provided with the user.

Normally, the character information comprising as the searched result described above is stored in the information providing server stored with files of the home pages. The user refer to the searched result as shown in FIG. 16, and, if there is a desired home page concerning the representative soccer players of Japan, performs an operation such as clicking the title (underlined in FIG. 16) of this home page. Thus, the user is able to access the information providing server stored with the file of the desired home page.

In the conventional searching service, however, only the character information was provided as the searched result. Hence, there has been a case where the user specifies the desired home page from the provided character information with a difficulty. Further, the character information as the searched result does not contain a content of the detailed information (the number of accesses, an information quantity etc) of the home page. Accordingly, the user was unable to obtain the detailed information on the home page indicated as the searched result unless having an actual access to the desired home page by use of the searched result.

Moreover, in the case of utilizing the conventional searching service, the user is normally provided with the information on a plurality of home pages as the searched result. At this time, the user, if incapable of specifying the desired home page from the searched result, must find out the desired home page by accessing the plurality of home pages contained in the searched result. Consequently, the operation of the user is complicated, and if the user could find out the desired home page by accessing the plurality of home pages, the information on the home pages accessed before the desired home page is found out was unnecessary to the user in the great of majority of cases.

SUMMARY OF THE INVENTION

It is a primary object of the present invention to provide an information providing server through which a use is, when searching information on the Internet and utilizing a searched result, able to properly specify necessary information out of pieces of information provided as the searched result.

To accomplish the above object, according to a first aspect of the present invention, an information providing server comprises a display control file composed of a character string fro display, and a control character string for controlling the display, and an index image configured such that a screen is displayed with the display control file shown in the form of a single image.

The information providing server in the first aspect of the invention is connected via a communications line to, e.g., a reference terminal for looking though information retained by the information providing server, and to a searching server for searching the information retained by the information providing server in response to a searching request given from the reference terminal. When the searching server receives the searching request from the reference terminal, the information providing server gives the searching server an the index image corresponding to this searching request.

According to the first aspect of the invention, for example, the index image can be provided to the client in response to the request given from the client. More specifically, for instance, when the searching server receives the searching request from the client, the information providing server gives the searching server the display control file (character information) and the index image which correspond to the searched result in response to the request from the searching server, and the searching server imparts the display control file and the index image to the reference terminal of the client. The client is thereby supplied with the character information taking the conventional form and the index image corresponding to this item of character information as the searched result. The client is therefore able to obtain a larger quantity of information from the searched result than by the prior art. Accordingly, it is feasible to select (specify) more properly the required information from the searched result than by the prior art.

The information providing server according to the fist aspect of the invention may further comprise an index image creating unit for creating the index image on the basis of the display control file. With this configuration, the index image can be created within the information providing server.

The information providing server according to the first aspect of the invention may further comprise a display-oriented file related to the display control file. The index image may be configured such that the display control file and the display-oriented file are shown in the form of the single images. Based on this configuration, the index image can be created similarly with respect to the file having the display-oriented file such as an image file etc.

According to a second aspect of the present invention, a searching server connected via a communications line to an information providing server and to a reference terminal for looking through files held by the information providing server, comprises an index image creating unit for receiving the file from the information providing server and creating an index image corresponding to the file, and a transmitting unit for transmitting to the reference terminal the index image created by the index image creating unit to together with link information to the information providing server.

According to the second aspect of the invention, the index image is created in response to the request given from the reference terminal, and transmitted to the reference terminal of the client. The client is thereby able to obtain from the index images a great amount of information on the files stored in the information providing server.

In the searching server according to the second aspect of the invention, the transmitting unit transmits to the reference terminal the index image created by the index image creating unit, and the file received from the information providing server together with the link information to the information providing server. This construction makes it possible to transmit to the client the file received from the information providing server as well as the index image. The client is therefore capable of gaining a much greater quantity of information.

The searching server according to the second aspect of the invention may further comprise a searching unit for obtaining a file corresponding to a request of the reference terminal from each of the plurality of information providing servers, and the index image creating unit creates an index image corresponding to each of the files obtained by the searching unit. With this construction, the index image can be obtained in combination with the information searching service provided by the searching server.

According to a third aspect of the present invention, a searching server connected via a communications line to an information providing server and to a reference terminal for looking through files held by the information providing server, comprises an element information storage unit for collecting and storing pieces of element information of files held by the information providing server, a searching unit for extracting the element information of the file corresponding to a request given from the reference terminal, from the element information of the files stored in the element information storage unit, an index image creating unit for creating an index image corresponding to the file element information extracted by the searching unit, and a transmitting unit for transmitting the created index image as a response to the request to the reference terminal.

The searching server according to the third aspect of the invention may further comprise a display control file creating unit for creating a display control file into which the element information extracted by the searching unit is combined with the index image created by the index image creating unit. the transmitting unit transmits to the reference terminal the display control file as a response to the request, which is created by the display control file creating unit.

According to a fourth aspect of the present invention, a searching server for giving files held by an information providing server to a reference terminal of a client, comprises an element information storage unit for collecting and storing pieces of element information of files held by the information providing server, an index image creating unit for creating and holding an index image corresponding to the element information of each of the files collected, a searching unit for extracting from the index image creating unit the index image corresponding to the request given from the reference terminal, and a transmitting unit for transmitting the index image extracted by the searching unit as a response to the request to the reference terminal.

In the searching server according to the fourth aspect of the invention, the searching unit extracts from the element information storage unit the element information of the file corresponding to the request given from the reference terminal. The searching server may further comprise a display control file creating unit for creating a display control file into which the file element information extracted by the searching unit is combined with the index image. The transmitting unit transmits to the reference terminal the display control file as a response to the request, which is created by the display control file creating unit.

According to a fifth aspect of the present invention, a reference terminal for looking through a file via a communications line, the file being composed of a display control file stored in an information providing server and a display-oriented file related to the display control file, comprises an index image creating unit for creating an index image configured such that the display control file and the display-oriented file contained in the file received from the information providing server are displayed on one screen, and a display control unit for displaying the file received from the information providing server together with the index image.

In the reference terminal according to the fifth aspect of the invention, the index image creating unit, when receiving the plurality of files, creates the index images corresponding respectively to the plurality of files received, and the display control unit sequentially displays the plurality of index images created.

In this case, the index image creating unit, when receiving the plurality of files, creates the index images in accordance with a predetermined priority, and the display control unit displays the plurality of created index images in the sequence being created by the index image creating unit.

In the reference terminal according to the fifth aspect of the invention, the index image creating unit, when receiving the plurality of files, creates the index images corresponding respectively to the plurality of files received, and the display control unit displays each of the plurality of created index images in arrangement on the same screen.

In this case also, the index image creating unit, when receiving the plurality of files, creates the index images in accordance with a predetermined priority, and the display control unit displays the plurality of created index images in the sequence being created by the index image creating unit.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 8 is an explanatory diagram showing a display content on the display device of the reference terminal shown in FIG. 1;

FIG. 16 is a diagram showing a display example of a retrieved result displayed in the reference terminal of a client by a home page searching method in the prior art.

DESCRIPTION OF THE PREFERRED EMBODIMENTS

Embodiments of the present invention will hereinafter be described with reference to the accompanying drawings.

<Embodiment 1>

Figure 1:
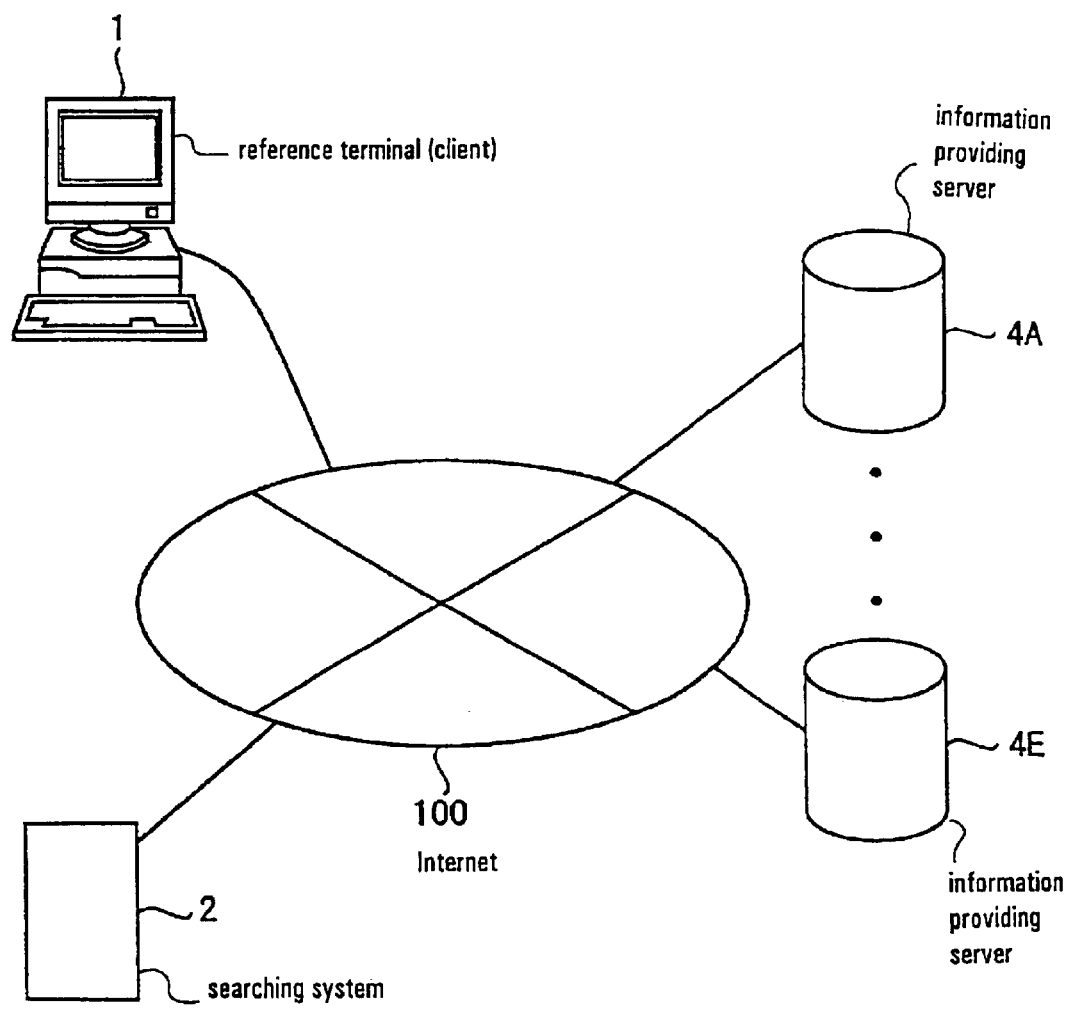
FIG. 1 is a diagram showing an architecture of a network system in an embodiment 1 of the present invention.

FIG. 1 is a diagram showing a network system in an embodiment 1 of the present invention. Referring to FIG. 1, the network system is comprising of a reference terminal 1 (client), a searching system 2 functioning as a searching server (a mediation server), and a plurality of information providing servers 4A–4E, which are all connected to the Internet (a data transmission network based on TCP/IP (Transmission Control Protocol/Internet Protocol)) 100. Referring to FIG. 1. however, only 4A, 4E are shown as the information providing servers.

The reference terminal 1 is information equipment that a user (client) refer to information on a home page. This reference terminal 1 is connected to the Internet 100 through an unillustrated data modulator (MODEM) by a dial-up connection, The reference terminal 1 obtains necessary information from the information providing servers 4A–4E through the Internet 100.

The reference terminal 1 may be a personal computer provided with a WWW (World Wide Web) browser for referring the information through the Internet 100, or may also be an Internet TV having a function for connecting to the Internet 100. Further, the reference terminal 1 may belong to other networks such as a LAN (Local Area Network) etc.

The searching system 2 is an information processing system. The searching system 2 collects, when the user of the reference terminal 1 searches a home page by utilizing a searching service prepared beforehand, information of the home page corresponding to the user's searching request from each of the information providing servers 4A–4E connected through the Internet 100. The searching system 2 provides the user with a searched result corresponding to the user's searching request.

This searching system 2 periodically navigates round (accesses) the information providing servers 4A–4E connected to the Internet 100, and searches keywords from text data of HTML (Hyper Text Markup Language) files of the home pages stored in the information providing servers 4A–4E, thus obtaining the searched keywords as element information.

Subsequently, the searching system 2 accesses the information providing servers 4A–4E stored with the files of the home pages which correspond to the element information, and collects the information (text data containing a URL (Uniform Resource Locator), a title and the keyword of the home page) relating to the first screen of the home page. Each of the element information of the HTML files collected are stored in an index file storage device 61 (see FIG. 3) provided in the searching system 2.

Thereafter, the searching system 2, according to a searching request given from the user (client), searches a home page containing the keyword assigned by the client, and provides, as a searched result, the reference terminal 1 of the client with the index information including the URL and the title et of that home page.

Each of the information providing servers 4A–4E is information equipment such as a personal computer, a workstation or dedicated server machine for providing the reference terminal 1 of the client with the information through the Internet 100. Each of the information providing servers 4A–4E stores a plurality of the HTML files of the home page, and a plurality of image files (corresponding to a display control file) having a GIF (Graphics Interchange Format) file format or JPEG Joint Photographic Experts Group) file format assigned by the HTML file.

Figure 2:
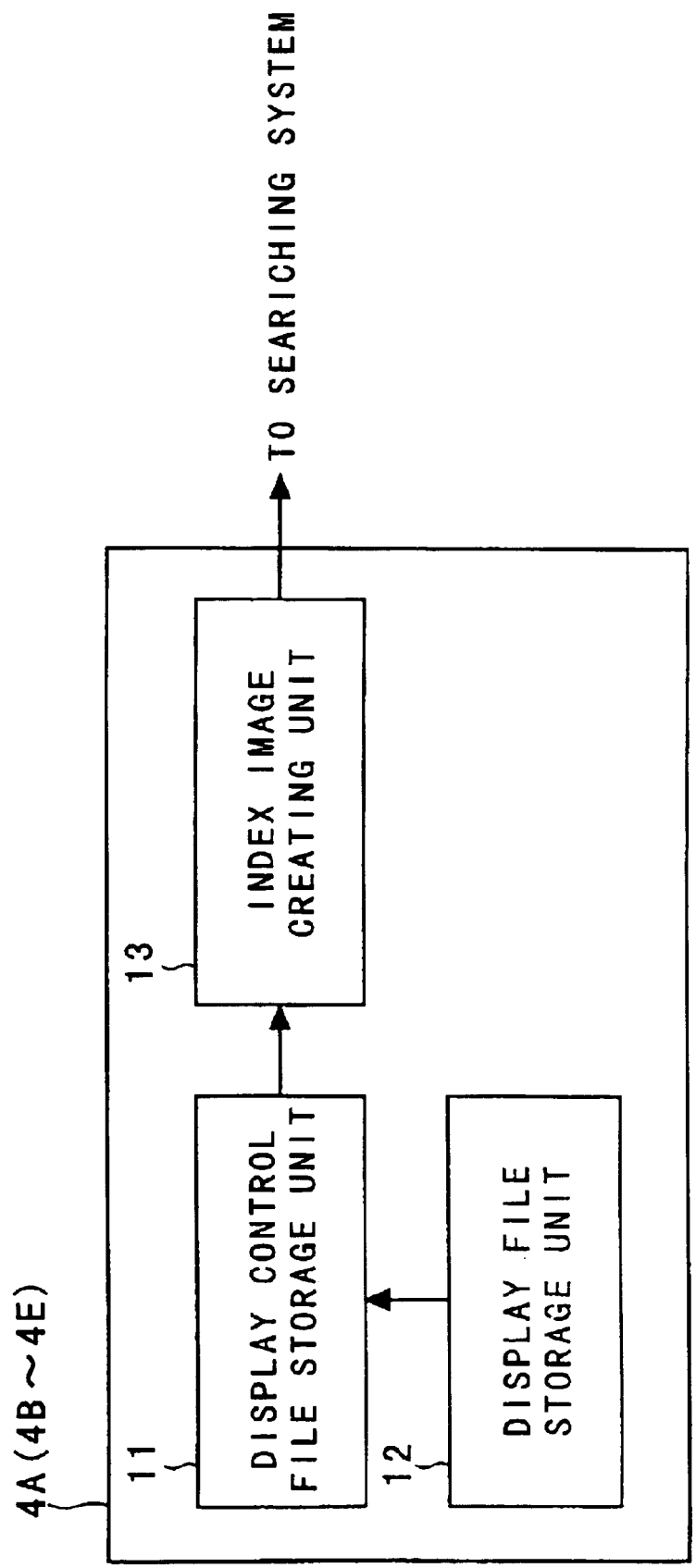
FIG. 2 is a diagram showing a construction of an information providing server shown in FIG. 1.

FIG. 2 is a block diagram showing a configuration of one of the information providing servers 4A–4E illustrated in FIG. 1. The information providing servers 4A–4E have the same configuration, and hence the information providing server 4A is exemplified in FIG. 2. Referring to FIG. 2, the information providing server 4A comprises a display control file storage unit 11, a display file storage unit 12 and an index image creating unit 13.

The display control file storage unit 11 is stored with the HTML files including text files of a home page (corresponding to display character strings), layout information and hyperlink information (corresponding to control character strings). The display file storage unit 12 is stored with the image file assigned in the HTML file stored in the display control file storage unit 11 by way of a file in the GIF (Graphics Interchange Format) file format and the JPEG (Joint Photographic Experts Group) format. Note that the text and the image are laid out based on the layout information assigned in the HTML file, thereby creating a screen for the home page read by the reference terminal 1. The display control file storage unit 11 and the display file storage unit 12 are respectively constructed of a readable/writable storage device such as a hard disk etc.

The index image creating unit 13 creates, from the HTML file stored in the display control file storage unit 11 and the image file stored in the display file storage unit 12, an index image file as an image file, having the same image data (display content) as the first screen of the home page to be displayed in the display device of the reference terminal 1, of which a display size is smaller than the first screen of the home page.

To be more specific, the index image creating unit 13 arranges the images displayed by the browser into an image file. At this time, bitmap data in a VRAM can be used as they are. Further, there may also be available a screen-cut-oriented application used in the personal computer. Note that the index image creating unit 13 is defined as a function actualized through an execution of a predetermined index image file creating program by a CPU (not shown) mounted in the information providing server 4A.

Figure 3:
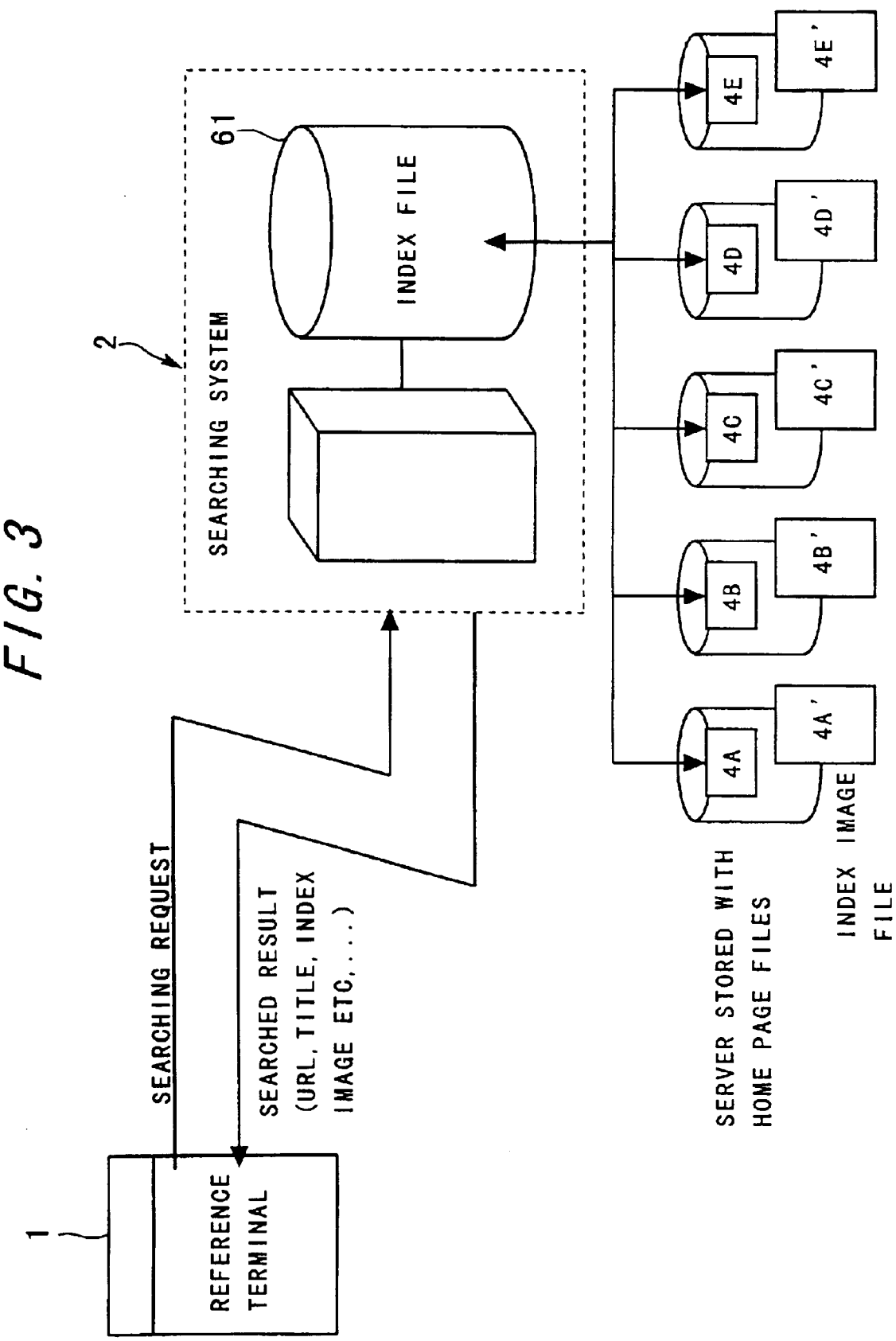
FIG. 3 is an explanatory diagram showing a home page searching method in the network system shown in FIG. 1.
Figure 4:
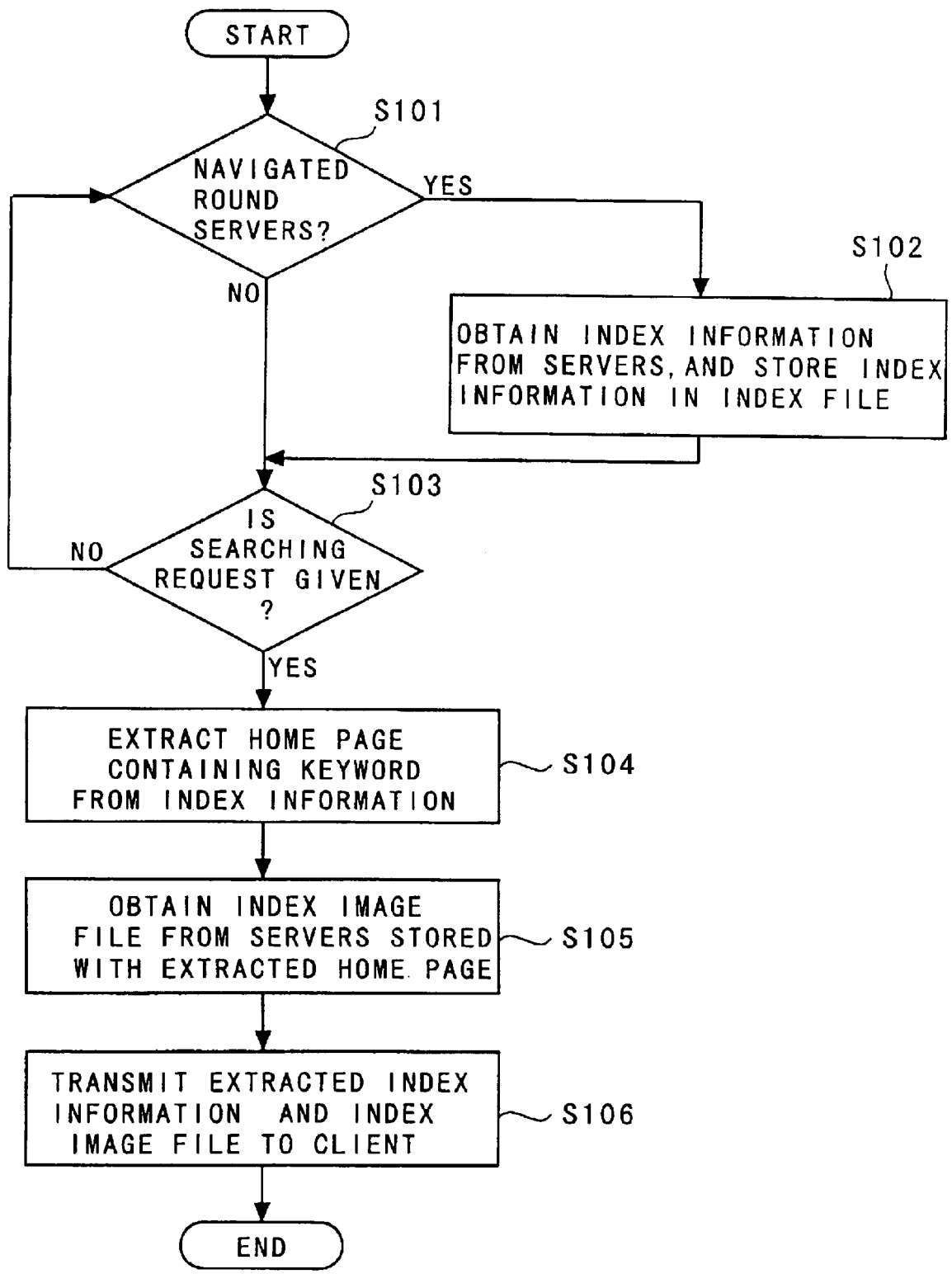
FIG. 4 is a flowchart showing an operation of a searching system shown in FIG. 1.
Figure 5:
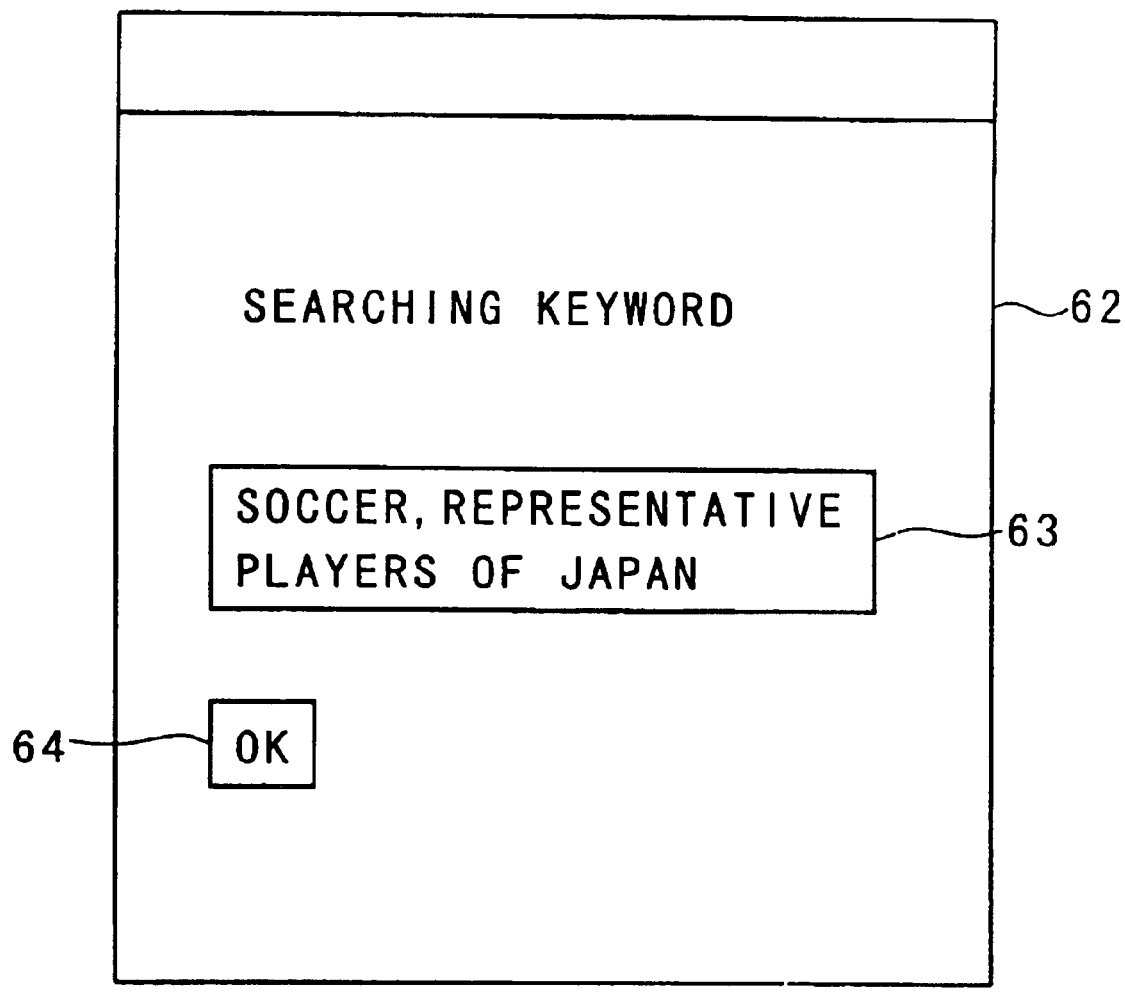
FIG. 5 is an explanatory diagram showing a display content on a display device of a reference terminal shown in FIG. 1.
Figure 6:
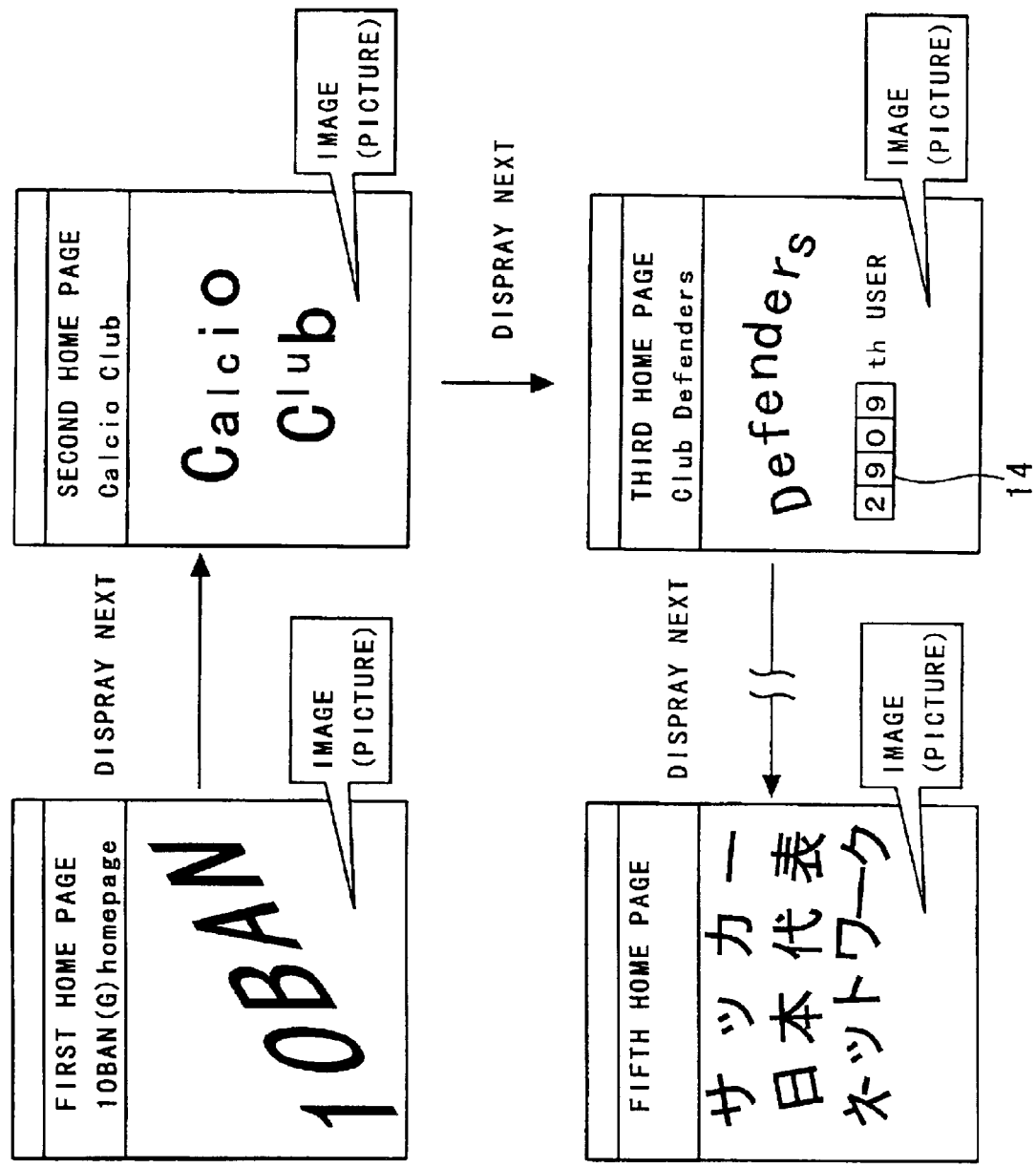
FIG. 6 is an explanatory diagram showing a display content on the display device of the reference terminal shown in FIG. 1.

FIG. 3 is an explanatory diagram showing a method of searching a home page in the network system illustrated in FIG. 1. FIG. 4 is a flowchart showing an operation of the searching system when carrying out the searching method shown in FIG. 3. Further, FIGS. 5 and 6 are explanatory diagrams each showing a display content on the display device provided in the reference terminal shown in FIG. 1.

An information searching method according to the present invention will hereinafter be described with reference to FIGS. 2–6. Herein, there is exemplified a case of searching a home page concerning representative soccer players of Japan. The searching system 2 periodically navigates round the information providing servers 4A–4E via the Internet 100 (step S101). The searching system 2 accesses each of the information providing servers 4A–4E, then obtains from the information providing servers 4A–4E the index information on the home pages retained in the information providing servers 4A–4E, and stores the index information in the index file storage device 61 (step S102).

The user of the reference terminal 1, when searching the home page, assigns keywords such as "soccer" and "representative players of Japan" by utilizing a search engine prepared in the reference terminal 1, and transmits a searching request to such as "soccer" and the representative players of Japan" to a searching keyword input field 63 in a search engine window displayed on the display device of the reference terminal 1, and thereafter clicks an OK button 64 by sue of a mouse. With such an operation, the searching request is transmitted from the reference terminal 1 to the searching system 2.

Next, the searching system 2, upon receiving the searching request from the reference terminal 1 (step S103), obtains the index information on the home page which contains the keyword assigned by the user among a plurality of index information on the plurality of home page which are stored in the storage device 61 (step S104). Thereafter, as shown in FIG. 3, the searching system 2 accesses the information providing servers 4A–4E stored with the home page information corresponding to the index information obtained in step S104, thereby obtaining image files 4A'–4E' of the relevant home pages (step S105).

On the other hand, in the information providing servers 4A–4E, the index image creating unit 13, as described above, creates and holds, from the HTML file and the image file relative to the HTML file, the index image files 4A–4E'. Each of the index image files 4A'–4E' include the image information when a size of the image on the first screen of the home page is reduced, and retains these files 4A'–4E'. This process is executed at an interval of a fixed time, and hence the index image creating unit 13 always holds the index image file corresponding to a latest state on the first screen of the home page. Therefore, the searching system 2, when having the access to the information providing servers 4A–4E, is given the index image files created and retained by the index image creating unit 13 of each of the information providing servers 4A–4E.

The searching system 2, upon obtaining the index image files 4A'–4E' of the home pages corresponding to the searched result from the information providing servers 4A–4E. The searching system 2 transmits these index image files 4A'–4E' to the reference terminal 1 together with link information to each home page and the index information (step S106, which corresponds to a transmitting unit).

The reference terminal 1, when receiving the index image files 4A'–4E' of the respective home pages, the link information and the index information, displays images corresponding thereto on the screen of the display device as a searched result. Namely, the index information on the representative soccer players of Japan is displayed in a predetermined area on the screen of the display device. The index information is, as in the case of the prior art, displayed as a list of character information as shown in FIG. 16.

Simultaneously, the index images corresponding to the index image files 4A'–4E' are displayed in a predetermined area on the screen of the display device of the reference terminal 1. Each index image is, as illustrated in FIG. 6, displayed in the predetermined area while being changed over at an interval of a fixed time in the sequence from the home page exhibiting a higher rate of coincidence with the keyword. Links for connecting to the information providing servers 4A–4E are set to the respective index images displayed on the display device.

The user is able to obtain, from the index images contained in the displayed searched result, the following information which could not be gained from the result of the searching based on only the character information in the prior art. First, an access counter 14 as shown in FIG. 6 is provided in the first screen of the home page, in which case the user is able to judge referring to a counter value included in the index image whether or not the home page opened has a high popularity.

Further, if there is an update hysteresis on the first screen of the home page, the user is able to judge with reference to the index image of the home page opened what degree of frequency the content of the home page has been updated to, and is also able to judge whether or not the home page opened contains the latest content. Moreover, the user can confirm the content of the home page and the number of links from the index image, and is therefore able to roughly judge a quantity of information contained in the home page opened.

Thus, the user can obtain from the index image the information which could not be gained from the result of the searching based on only the character information in the prior art, and is therefore able to promptly judge whether or not a desired item of information is contained in each of the home pages embraced in the searched result. Thereafter, the user is able to access the information providing server holding the information on the home page conceived inclusive of the desired item of information by clicking the index image judged to contain the desired information.

Accordingly, in accordance with the embodiment 1, it is of no necessity for the user to repeat, till a desired home page is found out, the operation of accessing the information providing server holding the information on the home page embraced in the searched result and judging whether the home page displayed in response to the accessing on the home page screen of the display device of the reference terminal 1 is what is desired or not. The user is thereby able to easily quickly search the home page. Thereby, a quantity with which the user operates the keyboard and the mouse and the operational intricacy relative to the searching is able to reduce. Further, it is feasible for the user to avoid the accesses to unnecessary home pages, and a time for connecting the reference terminal 1 to the Internet 100 can be reduced. Then, the user can properly select (specify) the home page containing the desired item of information from the searched result with reference to the index image.

Moreover, the searching system 2 in the embodiment 1, on the occasion of collecting pieces of information while navigating round the information providing servers 4A–4E, obtains only the index information such as URL etc, and, when receiving the searching request from the reference terminal 1, obtains the index image files 4A'–4E' corresponding to the searched result from the information providing servers 4A–4E. The searching system 2 then transmits the index image files to the reference terminal 1. With such a method being used, it might be enough for the searching system 2 to ensure a storage capacity required for storing the index image files of the home pages corresponding to the searched result, and hence the storage capacity of the searching system 2 might be set comparatively small.

Figure 7:
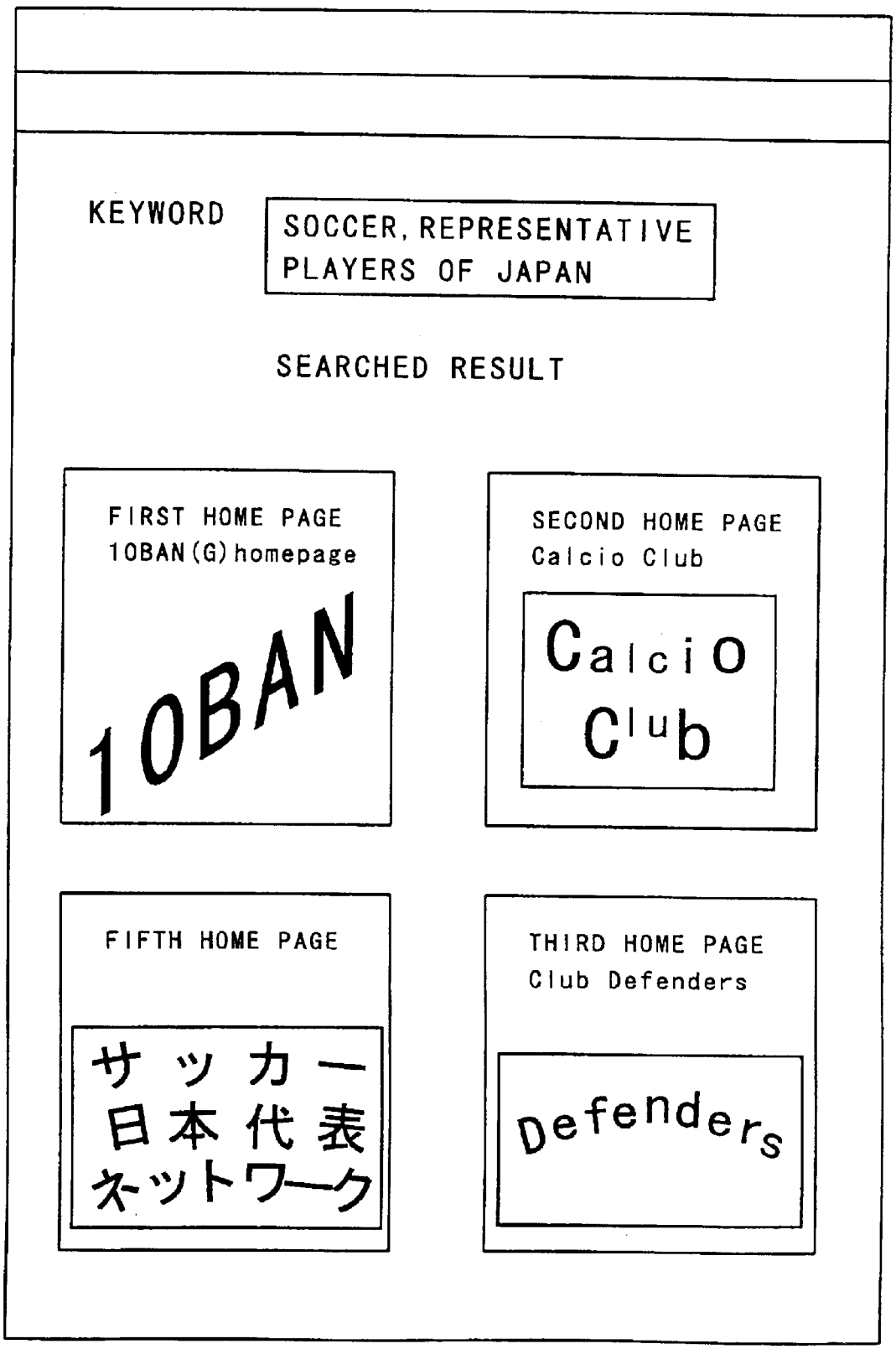
FIG. 7 is an explanatory diagram showing a display content on the display device of the reference terminal shown in FIG. 1.

Note that the embodiment 1 can be modified as follows. For example, in the embodiment 1, the index images are displayed in sequence at the interval of the fixed time when the searched result is displayed on the display device of the reference terminal 1. Instead of this, as shown in FIG. 7, there may also be taken such a configuration that the index images are displayed in arrangement on the same screen. In this case also, the user of the reference terminal 1 can easily judge whether or not the home page is what should be accessed to (the desired home page). Further, as illustrated in FIG. 8, another configuration is that the index images corresponding to the index information are displayed in positions adjacent to respective items of index information contained in the searched result.

Figure 9:
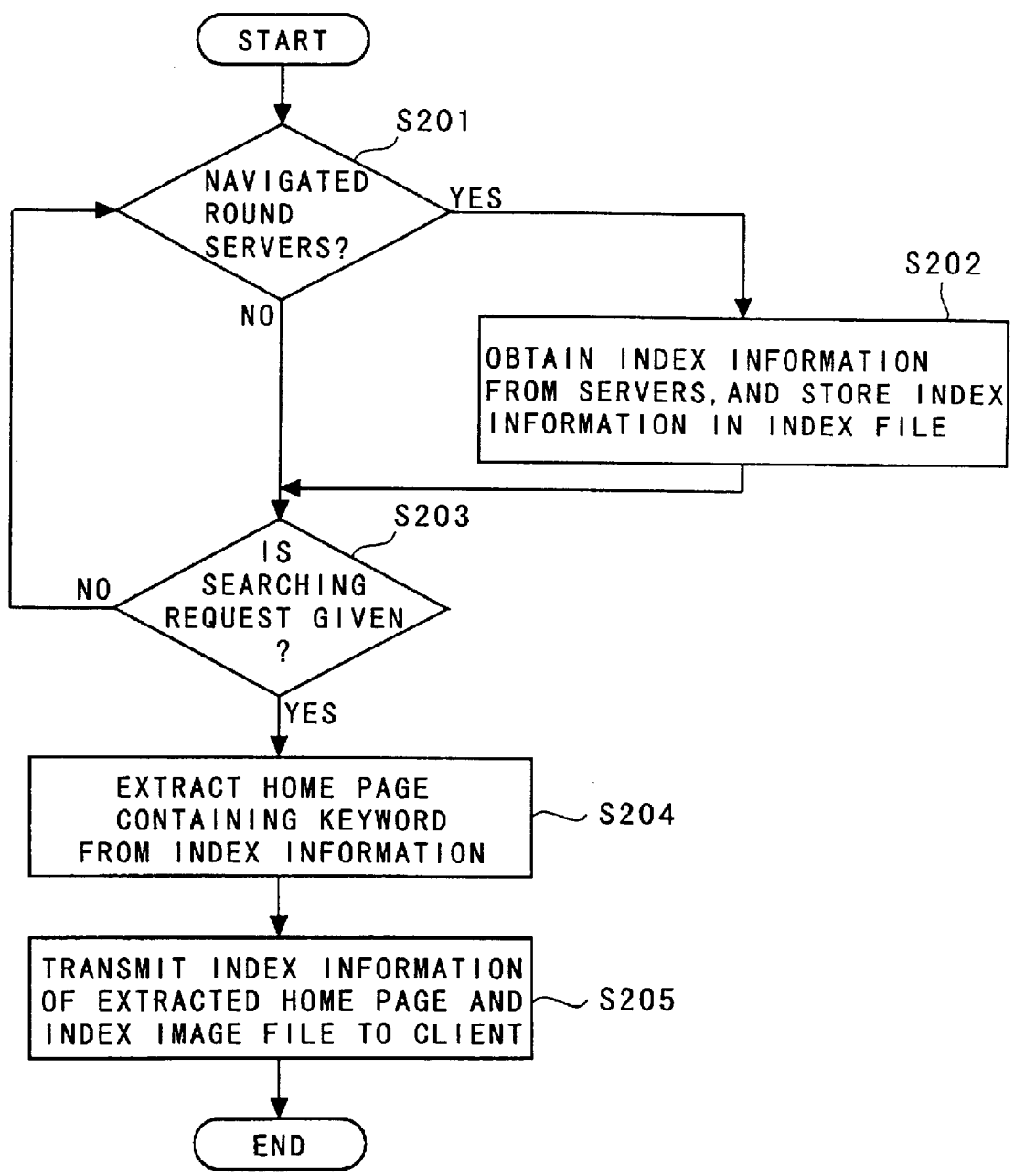
FIG. 9 is a flowchart showing an operation of a searching system 2 shown in FIG. 1.

Moreover, the index images can be also gained by the method which follow. FIG. 9 is a flowchart showing the operation of the searching system 2 in a case where the searching system 2 obtains the index image files by other methods. As shown in FIG. 9, the searching system 2, when periodically accessing the information providing servers 4A–4E be navigating round through the Internet (step S201), obtains the index image files together with the element information of the home pages from the information providing servers 4A–4E. The thus obtained index image files are stored in the index file storage device 61 of the searching system 2 together with the index information (the text containing the URL, the title and the keyword) on the home page opened (step S202).

Thereafter, the searching system 2, upon receiving the searching request from the reference terminal 1 (step S203), gives the reference terminal 1 the index information of the home page containing the keyword which is included in the searching request, the index image files and the link information as the searched result (steps S204, S205: which corresponds to a transmitting unit). According to the index image file obtaining methods described above, the storage device 61 of the searching system 2 is stored beforehand with the index image files of the home pages which can be retrieved by the searching system 2. Accordingly, there is no necessity for obtaining the index image files from the information providing servers 4A–4E after gaining the index information on the home pages corresponding to the searched result. It is therefore feasible to reduce the time necessary for the searching system 2 to provide the reference terminal 1 with the searched result.

<Embodiment 2>

Figure 10:
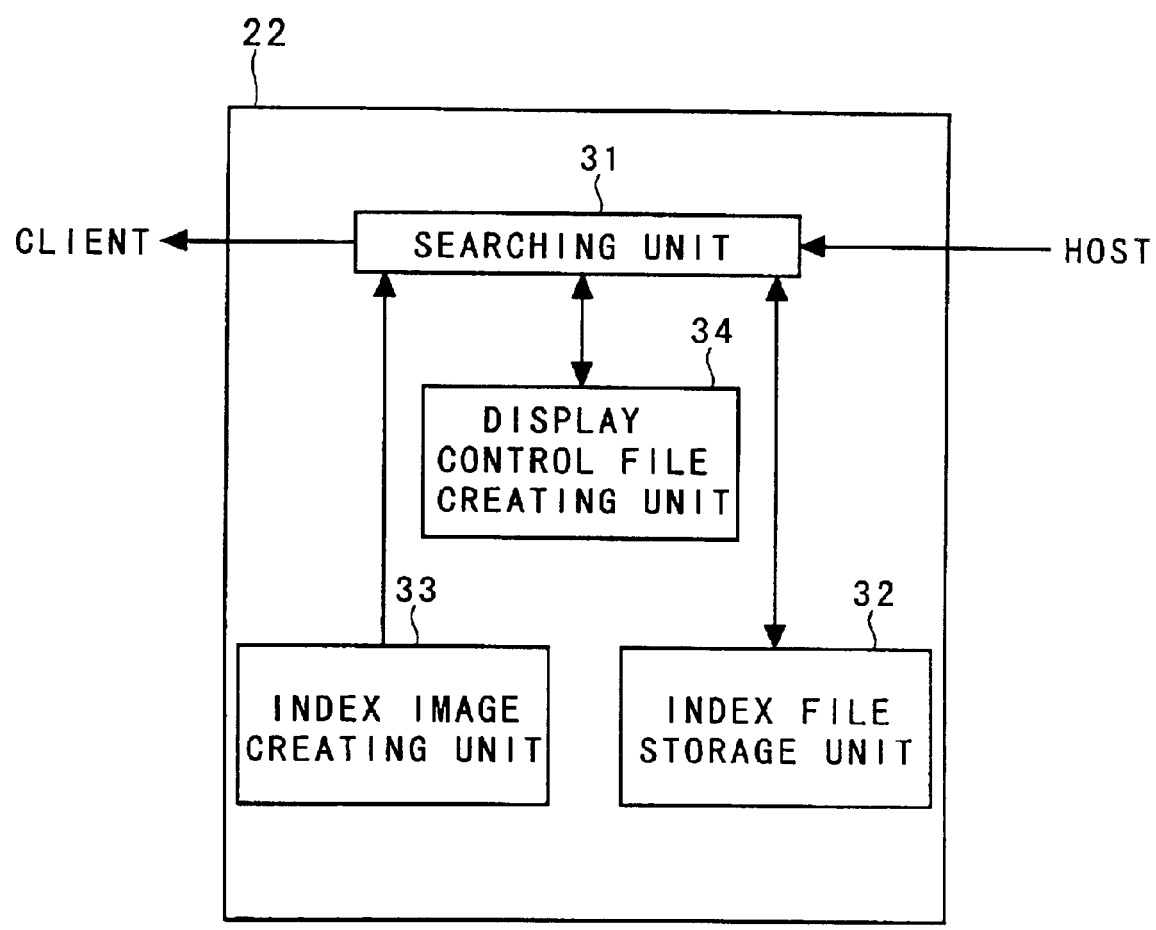
FIG. 10 is a diagram illustrating a construction of the searching system (searching servers) in an embodiment 2 of the present invention.
Figure 11:
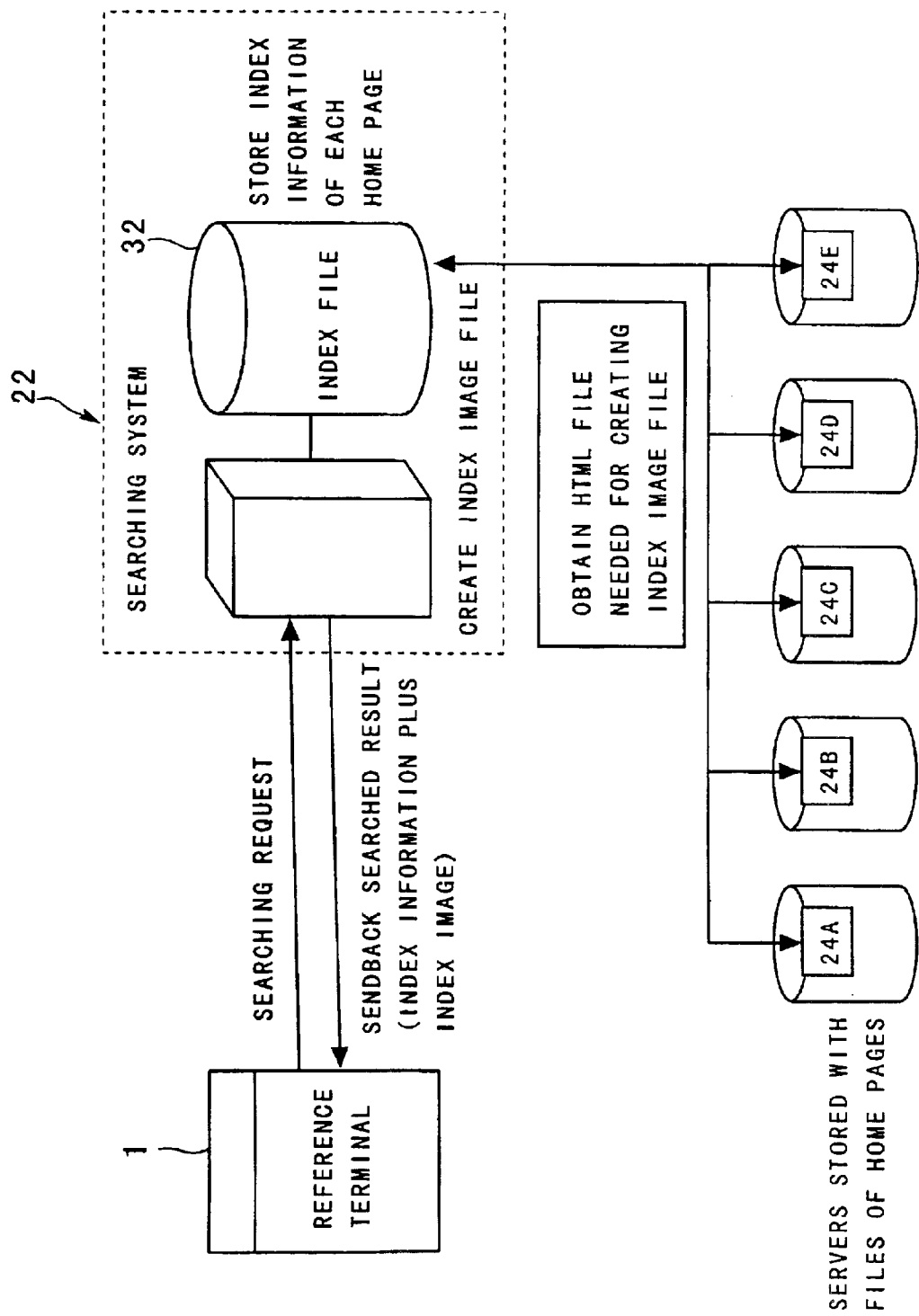
FIG. 11 is an explanatory diagram showing a home page searching method using the searching system illustrated in FIG. 10.
Figure 12:
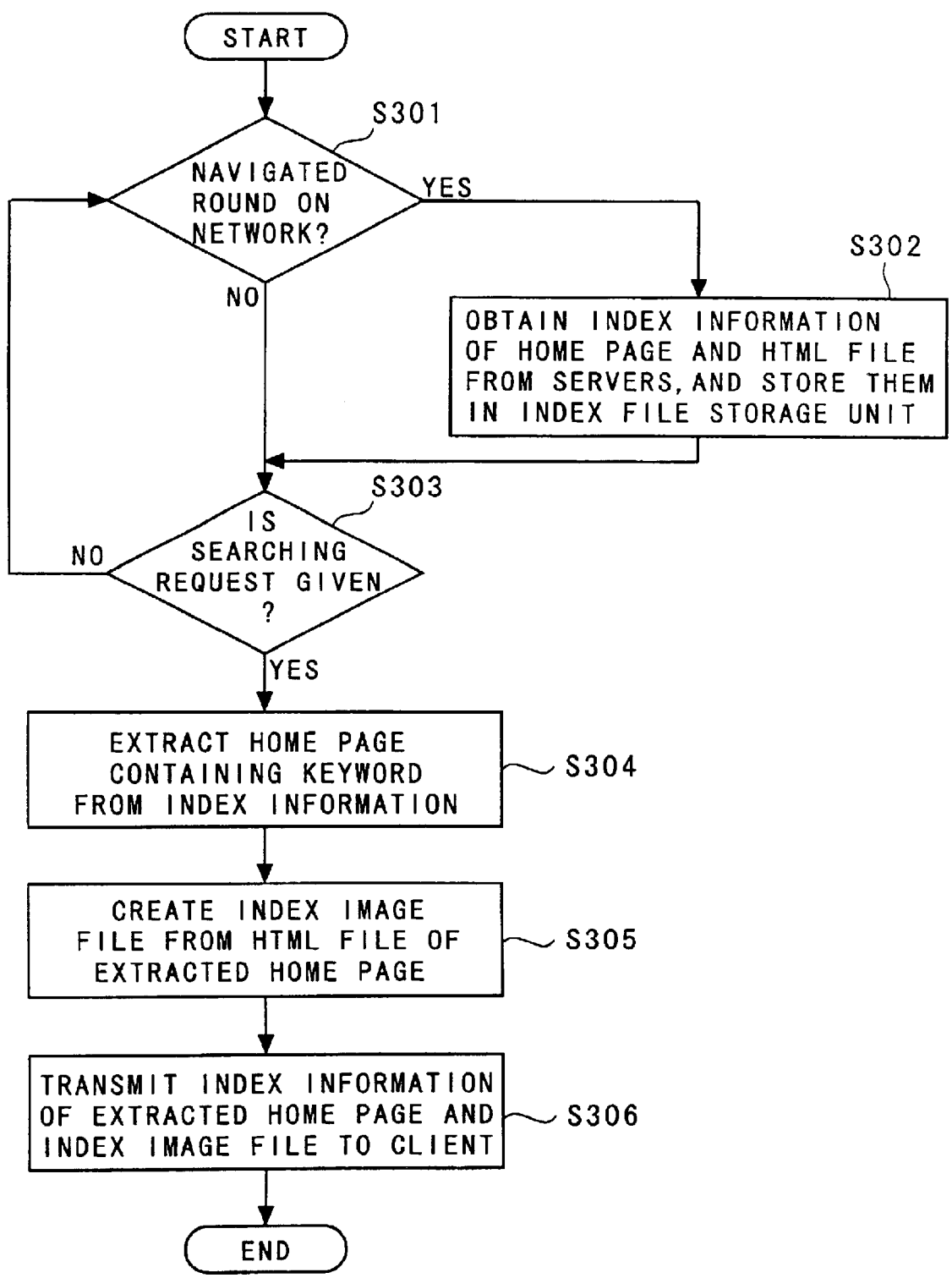
FIG. 12 is a flowchart showing an operation of the searching system illustrated in FIG. 10.

A characteristic of an embodiment 2 is that a searching system 22 has a unit for creating the above-described index image files, and other configurations are substantially the same as those in the embodiment 1. FIG. 10 is a block diagram showing an the searching system 22 in the embodiment 2. FIG. 11 is an explanatory diagram showing a method of searching the home page by the searching system 22 shown in FIG. 10. FIG. 12 is a flowchart showing an operation of the searching system 22 when executing the searching method shown in FIG. 11. The embodiment 2 will hereinafter be discussed referring to FIGS. 10–12.

Referring to FIG. 10, the searching system 22 includes a searching unit 31, an index file storage unit 32 corresponding to the storage device 61 in the embodiment 1, an index image creating unit 33, and a display control file creating unit 34.

The searching unit 31 periodically obtains the index information as element information on the home pages on the Internet 100 (see FIG. 1) and the information (the HTML file and the image files etc) pertaining to the first screen, and stores these items of information in the index file storage unit 32 (corresponding to an element information storage unit). When the searching system 22 receives the searching request from the reference terminal 1, the searching unit 31 fetches the index information on the home pages corresponding to the keyword contained in the searching request out of the index file storage unit 32, and gives the index information to the display control file creating unit 34.

The index image creating unit 33 gains through the searching unit 31 the HTML file and the image file relative to the first screen of the home page, which are retained in the information providing servers 24A–24E. Thereupon, the index image creating unit 33 creates from those files the index images defined as the image file with a reduced size of the first screen of the home page thereof.

The display control file creating unit 34, when the searching system 22 receives the searching request from the reference terminal 1, receives the index image file as well as the index information corresponding to the keyword contained in the searching request. The display control file creating unit 34 then creates the HTML file (a display control file) that should be given as a searched result to the reference terminal 1 by use of the index information and the index image file, and gives the HTML file to the searching unit 31. Thereupon, the searching unit 31 transmits to the reference terminal 1 the HTML file as the searched result, which has been received from the display control file creating unit 34.

Note that the index file storage unit 32 is included a readable/writable storage device such as a hard disk etc, and the searching unit 31, the index image creating unit 33 and the display control file creating unit 34 are each constructed of a CPU, a storage device and a peripheral device (any of which is not shown) and are actualized by the CPU executing a predetermined control program stored in the storage device.

A method of searching of the home page in the embodiment 2 will hereinafter be explained. As shown in FIGS. 11 and 12, the searching unit 31 of the searching system 22 periodically accesses the information providing servers 24A–24E on the Internet 100 (step S301), then obtains the index information on the home page and the information on the first screen of the home page from the information providing servers 24A–24E, and stores these items of information in the index file storage unit 32 (step S302).

Next, the reference terminal 1 transmits the searching request to the searching system 22 by the same method as that in the embodiment 1 (step S303). The searching unit 31, upon receiving this searching request, extracts from the index file storage unit 32 the index information on the home page containing the keyword assigned (designated) by the reference terminal 1 (step S304).

Next, the index image creating unit 33 gains the HTML file and the image file on the first screen of the home page corresponding to each item of index information from the information on the home page held by the creating unit 33 itself in accordance with the index information extracted by the searching unit 31. Then, the index image creating unit 33 creates the index image file with the reduced size of the first screen of the home page from the obtained HTML file and image file (step S305).

Next, the display control file creating unit 34 creates the HTML file for being given to the reference terminal 1 from the index information extracted by the searching unit 31 and the index image file created by the index image creating unit 33. Thereafter, the searching unit 31 transmits to the reference terminal 1 the HTML file as a result of the searching, which has been created by the display control file creating unit 34 (step S306: which corresponds to a transmitting unit).

Thereafter, the reference terminal 1, when receiving the searched result from the searching system 2, as in the embodiment 1, displays the character information (index information) on each home page containing the designated keyword on the screen of the display device of the reference terminal 1 (see FIG. 16), and displays the first screens (index images) of the respective home pages in a predetermined display sequence (see FIG. 8).

Thus, the contrivance in the embodiment 2 is not that the index images are retained in the information providing servers 24 stored with the home page files, but that the searching system 22 creates the index image file each time the searching request is received from the reference terminal 1. It is therefore unnecessary for each information providing server 24 to create the latest index image file at all times.

Further, when the searching system 22 receives the searching request from the reference terminal 1, the index image creating unit 33 obtains the required information from the index file storage unit 32, and thus creates the index image. In this respect, the searching system 22 may otherwise operate based on a flowchart shown in FIG. 13.

Figure 13:
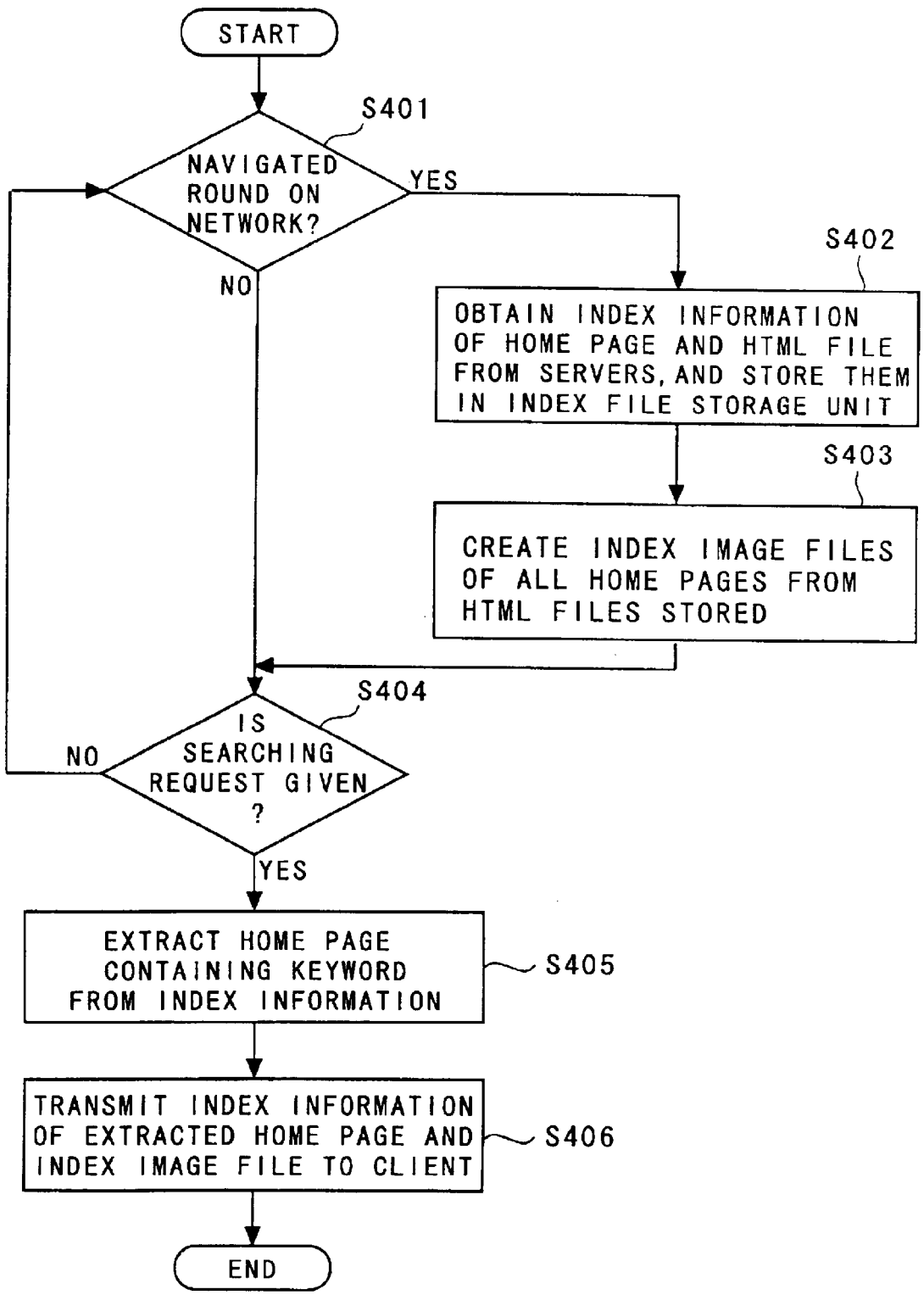
FIG. 13 is a flowchart showing the operation of the searching system illustrated in FIG. 10.

To be specific, as shown in FIG. 13, when the searching unit 31 periodically obtains the index information from the information providing servers 24 on the Internet 100 (step S402), the index image creating unit 33 creates the index image files of the respective home pages and stores the file in the index file storage unit 32 (step S403). When the searching system 22 receives the searching request from the reference terminal 1 (step S404), the searching unit 31 extracts from the index file storage unit 32 the index file of the home page containing the keyword designated by the reference terminal 1 and the index image file as well (step S405), and transmits these files as the searched result to the reference terminal 1 (step S406).

<Embodiment 3>

A characteristic of an embodiment 3 is that the index image files of the respective home pages each corresponding to the searched result are created in a reference terminal 41 (see FIG. 14) of the user, and other configurations are the same as those in the embodiment 1.

Figure 14:
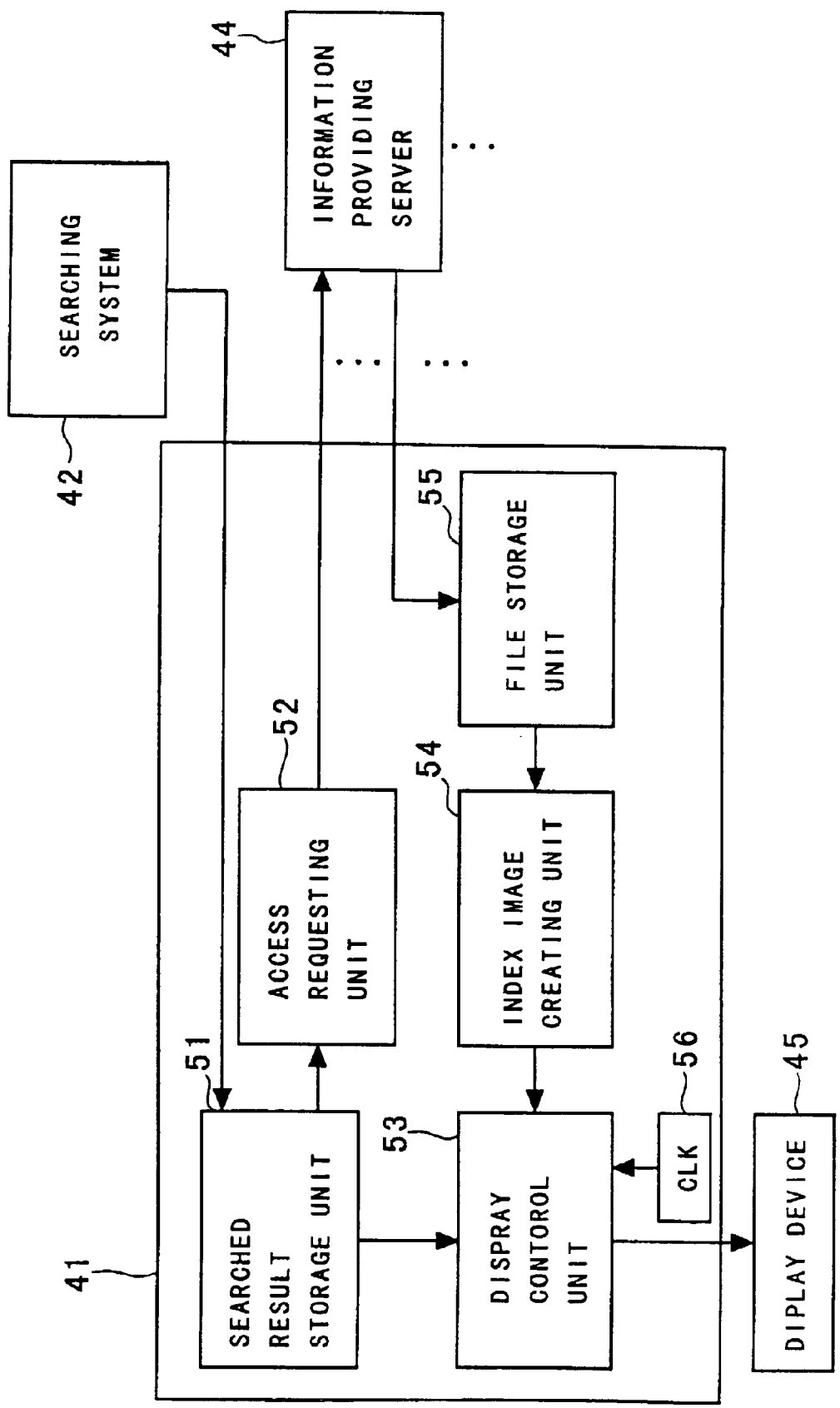
FIG. 14 is a diagram showing a construction of the reference terminal in am embodiment 3 of the present invention.

FIG. 14 is a diagram showing a construction of the reference terminal 41 in the embodiment 3 (as well as showing an the network system as a whole in the embodiment 3). Referring to FIG. 14, the reference terminal 41 is connected via the Internet (not shown) to a searching system 42 and information providing servers 44A–44E (of which only the information providing server 44A is illustrated in FIG. 14). The reference terminal 41 includes a searched result storage unit 51, an access request unit 52, a file storage unit 55, an index image creating unit 54, a display control unit 53 and a CLK (clock) 56.

The searched result storage unit 51 is classified as a storage device for storing the searched result (index information such as the URL and the title of the home page containing the keyword) obtained from the searching system 42. The access request unit 52 obtains the URL of the home page from the index information of each home page corresponding to the searched result stored in the searched result storage unit 51. Then, the access request unit 52 accesses information providing servers 44 stored with the files of the home pages, and obtains the HTML file and the image file needed for forming the first screen of each home page. The HTML file and the image file, which have been thus obtained from each home page, are stored in the file storage unit 55 of the reference terminal 41.

The index image creating unit 54 creates an index image file defined as an image file with a reduced size of the first screen of each home page, from the HTML file and the image file stored in the file storage unit 55. The display control unit 53 obtains a text file of the searched result from the searched result storage unit 51, and the index image file from the index image creating unit 54, respectively. The display control unit 53 outputs these files to a display device 45 such as a CRT (Cathode Ray Tube) and an LCD (Liquid Crystal Display).

Note that the reference terminal 41 incorporates the CPU, the storage devices (the ROM, the RAM and the hard disk etc) and peripheral devices (an I/O unit and an interface circuit etc). The searched result storage unit 51 and the file storage unit 55 are constructed of the storage devices. The access request unit 52, the display control unit 53 and the index image creating unit 54 are defined as functions actualized by the CPU executing a control program stored in the storage device.

Figure 15:
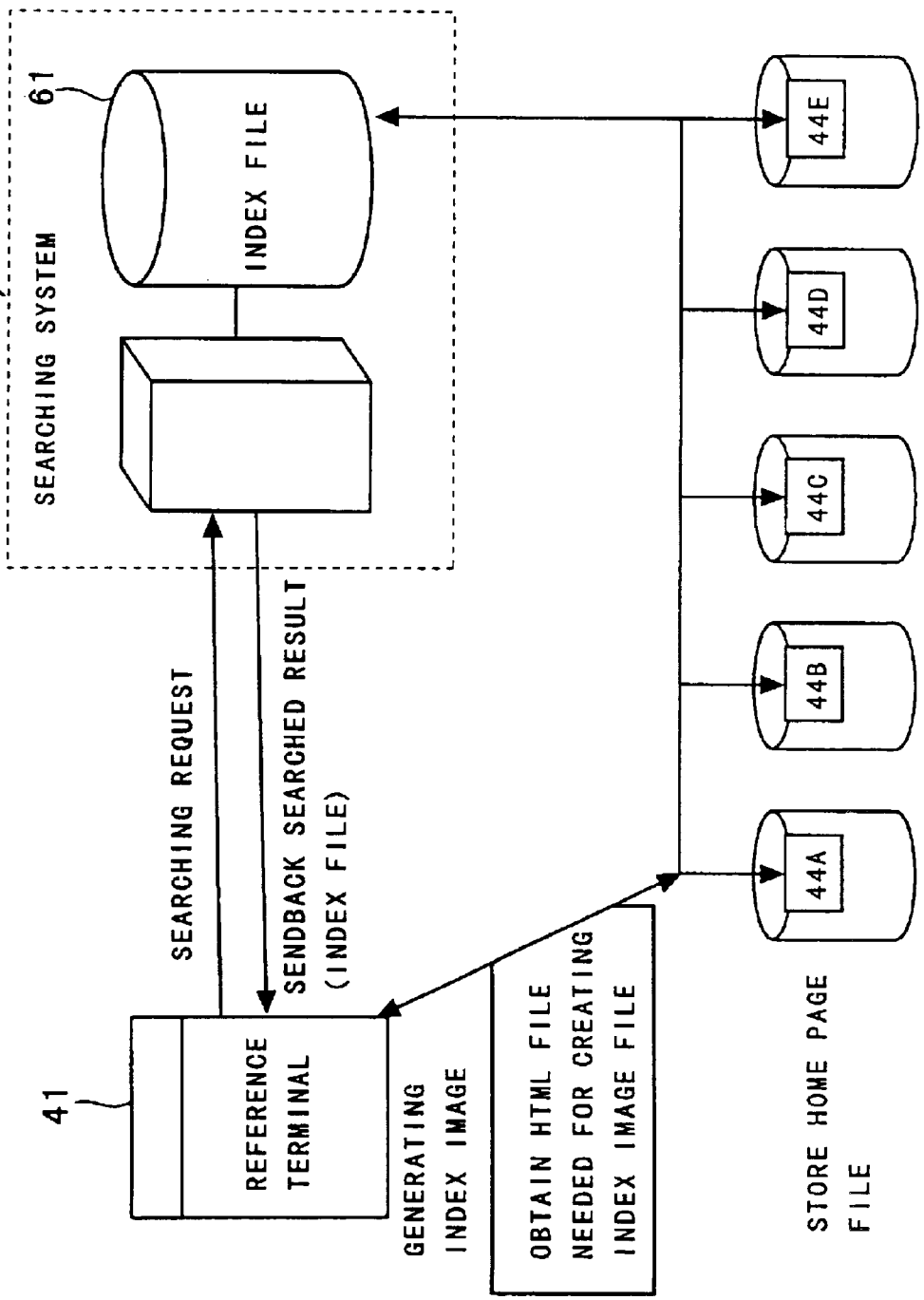
FIG. 15 is an explanatory diagram showing the home page searching method using the reference terminal illustrated in FIG. 14.

FIG. 15 is an explanatory diagram showing a method of searching the home page in the network system illustrated in FIG. 14. This searching method in the embodiment 3 will hereinafter be described with reference to FIGS. 14 and 15. To begin with, when the user of the reference terminal 41 operates the reference terminal 41 for searching the home page as in the embodiment 1, the reference terminal 41 transmits the searching request to the searching system 42.

The searching system 42, based on the keyword inputted by the reference terminal 41, extracts the index information on the home page containing this keyword from the index file storage device 61, and transmits the extracted index information as a searched result to the reference terminal 41.

The searched result is, when received by the reference terminal 41, stored in the searched result storage unit 51. Thereupon, the display control unit 53 displays the searched result stored in the searched result storage unit 51 on the screen of the display device 45 (see FIG. 16).

On the other hand, the access request unit 52 obtains the URL of each home page corresponding to the searched result from the searched result storage unit 51. Subsequently, the access request unit 52 have an access to the information providing server (at least one of the information providing servers 44A–44E) stored with the file of the home page corresponding to the obtained URL, and gains the HTML file and the image file which form the first screen of each home page. The access request unit 52, with respect to the information providing servers that should be accessed at this time, accesses the information providing servers sequentially from the information providing server having a less load for obtaining the file.

The HTML files and the image files obtained by the access request unit 52 are stored in the file storage unit 55. Then, the index image creating unit 54 creates the index image file by use of the HTML files and the image files which are stored in the file storage unit 55. The index image file of each home page which corresponds to the searched result, is thereby created.

Thereafter, the display control unit 53, as shown in FIG. 3, displays on the display device 54 the image (index image) corresponding to the index image file of each home page at a timing of receipt from the CLK 56 in a predetermined sequence while being switched over at an interval of a fixed time.

As a result, the respective files are displayed in the following sequence. At the first onset, the searched result (the index information) of the character information transmitted from the searching system 42. The user of the reference terminal 41 looks through at first the searched result of the character information, during which the display control unit 53 displays on the display device 45 the index images corresponding to the index image files created by the index image creating unit 54, e.g., in the sequence of being created.

Accordingly, the user refers the index images displayed on the display device 45 at the interval of the fixed time, whereby it is feasible to obtain the information of the respective home pages and access a desired home page. Note that the configuration in the embodiment 3 is also such that the plurality of index images are displayed in arrangement on the same screen as shown in FIGS. 7 and 8.

Thus, in the embodiment 3, the reference terminal 41 creates the index image files of the respective home pages which are obtained as the searched result, and displays on the display device 45 the index images corresponding to the index image files. With such a configuration, as in the embodiments 1 and 2, it is also feasible to obtain a larger quantity of information of the home pages corresponding to the searched result than by the prior art. The user is therefore able to quickly exactly select (specify) a desired home page from the searched result.

Further, in the embodiment 3, for obtaining the required file in order to create the index image file, the information providing servers are accessed sequentially from the information providing server having the less load for gaining the file. Hence, while the user refers other index images, the file needed for creating the index image creating file can be gained from the information providing server exhibiting a high load (requiring much time for obtaining the file). It is therefore possible to eliminate a futility of time.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An information providing server, comprising:
a storing section storing a display control file including a character string and a control character string for controlling a display, wherein the display control file is provided to a client according to a search request from the client;
a holding section holding an index image which displays contents of a home page displayed according to the display control file and a display file relating to the display control file by a single picture; and
a providing section providing the index image held by the holding section according to the search request to a searching server, wherein the providing section provides, to the searching server, the index image to be included in a searched result corresponding to the search request that the searching server receives from the client, the searched result including the index image is provided from the searching server to the client, wherein the index image displays a latest state of the first screen of the home page.

2. An information providing server according to claim 1, further comprising an index image creating section creating the index image on the basis of the display control file.

3. An information providing server according to claim 1, wherein the storing section stores the display file related to the display control file, and the index image displays the home page displayed on the basis of the display control file and the display file by the single picture.

4. A mediation server providing a client with a file relating to a home page held by an information providing server, comprising:
an index image creating section creating an index image corresponding to each file received from the information providing server wherein each index image displays contents of a home page relating to each file by a single picture;
a storing section storing the index image created by the index image creating section;
a receiving section receiving a search request from the client;
a searching section searching a file corresponding to the search request, obtaining an index image corresponding to the searched file from said storing section, and generating a searched result corresponding to the search request, the searched result including the obtained index image and link information to be accessed by the information providing server; and
a transmitting section transmitting, to the client, the searched result generated by said searching section, wherein the index image displays a latest state of the first screen of the home page.

5. A mediation server according to claim 4, wherein the transmitting section transmits the index image, the link information and a corresponding file received from the information providing server to the client.

6. A mediation server providing a client with a file held in an information providing server, comprising:
an element information storage section collecting and storing element information of each home page held by the information providing server;
a searching section extracting an element information corresponding to a search request given from the client from the element information storage section;
an index image creating section creating an index image corresponding to the element information extracted by the searching section wherein the created index image displays contents of a home page corresponding to the extracted element information by a single picture; and a transmitting section transmitting a searched result including the created index image, as a response corresponding to the search request, created by the index image creating section to the client, wherein the index image displays a latest state of the first screen of the home page.

7. A mediation server according to claim 6, further comprising a display control file creating section creating a display control file including the element information extracted by said searching section and the index image created by said index image creating section, wherein the transmitting section transmitting a searched result including a display control file, as the response corresponding to the request, created by the display control file creating section to the client.

8. A mediation server providing a client with files held by a plurality of information providing servers, comprising:

an element information storage section collecting and storing element information of each home page held by each of the information providing servers;

an index image creating section creating and holding an index image corresponding to element information of each home page collected by said element information storage section wherein the index image displays contents of a home page corresponding to the element information by a single picture;

a searching section extracting, from the index image creating section, an index image corresponding to a search request given from the client; and a transmitting section transmitting a searched result including the index image extracted by the searching section, as a response to the search request to the client, wherein the index image displays a latest state of the first screen of the home page.

9. A mediation server according to claim 8, wherein the searching section extracts, from the element information storage section, element information corresponding to the search request given from the client, the mediation server further comprises a display control file creating section creating a display control file including the element information extracted and an index image corresponding to the element information, and the transmitting section transmits to the client a searched result including the display control file, as a response to the search request, created by the display control file creating section.

10. A reference terminal for referring to a file of a home page, the file is held by an information providing server and including a display control file and a display file related to the display control file, comprising:

a transmitting/receiving section transmitting a search request of the file to a mediation server and receiving a searched result from the mediation server;

an index image creating section automatically creating an index image which displays contents of a home page displayed on the basis of the display control file and the display file received from the information providing server by a single picture, wherein the display control file and the display file corresponds to the searched result; and a display section displaying contents of the searched result received from the mediation server together with the index image, wherein the index image displays a latest state of the first screen of the home page.

11. A reference terminal according to claim 10, wherein the index image creating section, when a plurality of files are received, respectively creates an index image corresponding to each of the files received, and the display section sequentially displays the plurality of index images created while being changed over.

12. A reference terminal according to claim 10, wherein the index image creating section, when a plurality of files are received, respectively creates an index image corresponding to each of the files received, and the display section displays the plurality of index images and a piece of character information included in the searched result in arrangement on the same window.

13. A reference terminal according to claim 10, wherein the index image creating section, when a plurality of files are received, respectively creates the index images corresponding to each of the files received in accordance with a predetermined priority, and the display control section sequentially displays the plurality of created index images in the sequence of being created by the index image creating section.

14. An information providing method in which an information providing server provides another server with a display control file including a display character string and a control character string for controlling a display, comprising:

creating an index image displaying contents of a home page displayed on the basis of the display control file by a single picture; and transmitting the index image created together with the display control file to a searching server according to a search request to the searching server, wherein the searching server receives the search request from a client, creates a searched result corresponding to the search request including the display control file and the index image that receives from the information providing server, and transmits the searched result to the client, wherein the index image displays a latest state of the first screen of the home page.

15. An information providing method in which an information providing server provides another server with a display control file and a display file relating to the display control file, comprising:

creating an index image displaying contents of a home page displayed on the basis of the display control file and the display file by a single picture; and transmitting the index image together with the display control file to a searching server according to a search request from the searching server, wherein the searching server receives the search request from a client, creates a searched result corresponding to the search request including a display control file and an index image that receives from the information providing server, and transmits the searched result to the client, wherein the index image displays a latest state of the first screen of the home page.

16. An information providing method of a mediation server, comprising:

obtaining element information of each home page held in an information providing server;

extracting a piece of element information corresponding to a search request given from a client among the obtained element information;

creating a searched result corresponding to the search request including an index image which displays contents of a home page corresponding to the extracted element information by a single picture; and transmitting the searched result including the created index image to the client, wherein the index image displays a latest state of the first screen of the home page.

17. An information providing method of a mediation server according to claim 16, further comprising:

creating a searched result corresponding to the search request including a display control file including the extracted element information and the created index image; and transmitting the searched result including the display control file to the client.

18. An information providing method of a mediation server, comprising:

obtaining and storing element information of home pages held by an information providing server;

creating and holding index images which respectively display contents of a home page corresponding to each of the stored element information by a single picture;

extracting an index image corresponding to a search request given from a client from the held index images; and transmitting a search result corresponding to the search request including the extracted index image to the client, wherein the index image displays a latest state of the first screen of the home page.

19. An information providing method of a mediation server according to claim 18, comprising:

extracting a piece of element information corresponding to the extracted index image among the stored element information;

creating a display control file including the extracted element information and the extracted index image; and transmitting a searched result including the created display control file to the client.

20. An information reference method of a reference terminal, comprising:

receiving a searched result corresponding to a search request for a file from a searching server;

receiving a file corresponding to the searched result from an information providing server, the received file containing a display control file and a display file;

automatically creating an index image displaying contents of a home page on the basis of the display control file and the display file by a single picture; and displaying the created index image together with the searched result, wherein the index image displays a latest state of the first screen of the home page.

21. An information reference method of a reference terminal according to claim 20, further comprising displaying contents of the received file together with the index image.

22. A computer readable medium recorded with programs executed by a computer, the programs comprising:

a program by which an information providing server creates an index image, wherein the index image displays, by a single picture, contents of a home page on the basis of a display control file including a display character string and control character string for controlling displaying; and a program by which the information providing server transmits to a mediation server the created index image in response to a request given from the mediation server, wherein the mediation server receives a search request from a client, creates a searched result corresponding to the search request including a display control file and an index image that receives from the information providing server, and transmits the searched result to the client, wherein the index image displays a latest state of the first screen of the home page.

23. A computer readable medium according to claim 22, wherein the programs further comprises a program by which the information providing server transmits the display control file together with the index image to the mediation server.

24. A computer readable medium recorded with programs executed by a computer, the programs comprising:

a program by which an information providing server creates an index image, wherein the index image displays, by a single picture, contents of home page on the basis of a display control file and a display file relating to the display control file; and a program by which the information providing server transmits to a mediation server the created index image in response to a request given from the mediation server, wherein the mediation transmits to a client a searched result including the index image corresponding to a search request from the client, wherein the index image displays a latest state of the first screen of the home page.

25. A computer readable medium according to claim 24, wherein the programs further comprises a program by which the information providing server transmits the display control file together with the index image to the mediation server.

26. A computer readable medium recorded with programs executed by a computer, the programs comprising:

a program by which a mediation server collects a piece of element information of each file held by an information providing server;

a program by which the mediation server extracts a piece of element information corresponding to a search request given from a client among the collected element information;

a program by which the mediation server creates a searched result corresponding to the search request including an index image which displays contents of a home page corresponding to the extracted element information by a single picture; and a program by which the mediation server transmits the searched result including the created index image to the client, wherein the index image displays a latest state of the first screen of the home page.

27. A computer readable medium according to claim 26, wherein the programs further comprises:

a program by which the mediation server creates a searched result corresponding to the search request including a display control file including the extracted element information and the created index image; and a program by which the mediation server transmits the searched result including the created display control file to the client.

28. A computer readable medium recorded with programs executed by a computer, wherein the programs comprising:

a program by which a mediation server collects a plurality of element information of files held by an information providing server;

a program by which the mediation server creates index images which respectively display contents of a home page corresponding to each of the collected element information;

a program by which the mediation server extracts an index image corresponding to a search request given from a client among the created index images and generates a searched result corresponding to the search request including the extracted index image; and a program by which the mediation server transmits the searched result to the client, wherein the index image displays a latest state of the first screen of the home page.

29. A computer readable medium according to claim 28, wherein the programs further comprising:

a program by which the mediation server extracts an element information corresponding to a search request given from a client among the collected element information;

a program by which the mediation server creates a searched result corresponding to the search request including a display control file including the extracted element information and the extracted index image file; and a program by which the mediation server transmits the searched result to the client.

30. A computer readable medium recorded with a program executed by a computer, wherein the programs comprising:

a program by which a reference terminal receives a searched result corresponding to a search request for a file from a mediation server;

a program by which the reference terminal receives from an information providing server a display control file and display file related to the display control file corresponding to the searched result;

a program by which the reference terminal automatically creates an index image displaying contents of a home page displayed on the basis of the display control file and the display file by a single picture; and a program by which the reference terminal displays the created index image together with the searched result, wherein the index image displays a latest state of the first screen of the home page.

31. An information providing server, providing a client with a home page including image and text according to a request of the client, comprising:

a storing section storing a display control file for displaying the home page on a screen of the client;

a holding section holding a piece of index image data for displaying contents of a home page displayed on the basis of the display control file by a single picture; and a providing section providing the index image data with a mediation server in response to a request given from the mediation server, wherein the mediation server receives a search request from the client, creates a searched result including display control file and an index image corresponding to the search request that receives from the information providing server, and transmits the searched result to the client, wherein the index image displays a latest state of the first screen of the home page.

32. An information providing server according to claim 31, further comprising:

a creating section creating the index image data based on the display control file.

33. An information providing server according to claim 31, wherein the index image data includes a piece of data for displaying the home page in which a display size of the home page displayed on the basis of the display control file on a screen of the client is reduced.

34. An information providing server according to claim 31, wherein the index image displays the home page by a display size smaller than an original size.

35. An information providing method of an information providing server, comprising:

periodically generating and storing an index image displaying contents of a respective home page; and displaying the respective index image based on a search request.

36. An information providing method according to claim 35, wherein the index image is generated upon receiving the search request.

* * * * *

UNITED STATES PATENT AND TRADEMARK OFFICE
CERTIFICATE OF CORRECTION

PATENT NO. : 6,829,619 B1
DATED : December 7, 2004
INVENTOR(S) : Hidehisa Wakamatsu et al.

It is certified that error appears in the above-identified patent and that said Letters Patent is hereby corrected as shown below:

Column 17,
Line 30, after "18," insert -- further --.

Signed and Sealed this

Thirteenth Day of December, 2005

JON W. DUDAS
*Director of the United States Patent and Trademark Office*